US008630877B1

(12) United States Patent
Billman et al.

(10) Patent No.: US 8,630,877 B1
(45) Date of Patent: Jan. 14, 2014

(54) SYSTEMS AND METHODS FOR RETIREMENT GAP INSURANCE

(75) Inventors: Bradly Jay Billman, San Antonio, TX (US); Billie Jean West, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 343 days.

(21) Appl. No.: 12/504,713

(22) Filed: Jul. 17, 2009

(51) Int. Cl.
*G06Q 40/00* (2012.01)

(52) U.S. Cl.
USPC ............................................................ 705/4

(58) Field of Classification Search
USPC ............................................. 705/4, 36, 36 R
See application file for complete search history.

(56) References Cited

U.S. PATENT DOCUMENTS

| | | | | |
|---|---|---|---|---|
| 5,429,506 | A * | 7/1995 | Brophy et al. | 434/107 |
| 7,647,261 | B2 * | 1/2010 | Merton et al. | 705/35 |
| 7,650,303 | B2 * | 1/2010 | Loeper | 705/36 R |
| 2005/0010516 | A1 * | 1/2005 | Ivanov et al. | 705/36 |
| 2005/0027632 | A1 * | 2/2005 | Zeitoun et al. | 705/36 |
| 2005/0137953 | A1 * | 6/2005 | McDonough et al. | 705/36 |
| 2006/0241989 | A1 * | 10/2006 | Walters et al. | 705/7 |
| 2007/0143199 | A1 * | 6/2007 | Stiff et al. | 705/36 R |
| 2008/0114703 | A1 * | 5/2008 | Dahlberg et al. | 705/36 R |
| 2008/0133280 | A1 * | 6/2008 | Ziegler | 705/4 |
| 2008/0168007 | A1 | 7/2008 | Clark et al. | |
| 2008/0270194 | A1 * | 10/2008 | West et al. | 705/4 |
| 2009/0228306 | A1 * | 9/2009 | Izyayev et al. | 705/4 |
| 2009/0281842 | A1 * | 11/2009 | Hendrix | 705/4 |
| 2011/0004492 | A1 * | 1/2011 | Bradshaw et al. | 705/4 |

FOREIGN PATENT DOCUMENTS

WO WO 2007/103107 * 9/2007 ............ G06Q 40/00

OTHER PUBLICATIONS

Essential Money Ltd: Retirement Options—Phased Drawdown, 2007 (Web atchives), pp. 1-2.*
Dus et al.: Betting on death and capital market at retirement: a shortfall anaysis of life insurance versus phased withdrawal plans. 2004, Financial Services Review, 14, pp. 169-196.*
Ghilarducci, Teresa: Guaranteed Retirement Accounts: Toward Retirement Security, Nov. 20, 2007, EPI Briefing Paper #204, Economic Policy Institute, pp. 1-20.*
Schmeiser et al.: Life Annuity Insurance versus Self-Annuitization: An Anaysis from Perspective of the Family, Apr. 2005, Institute of Insurance Economics, University of St. Gallen, pp. 1-22.*
"Guaranteed Return Plus", Integrity Life Insurance Company, IL-13-0001-0710, 4 pages, 2007.

* cited by examiner

*Primary Examiner* — Bijendra K Shrestha
(74) *Attorney, Agent, or Firm* — Kilpatrick Townsend & Stockton LLP

(57) ABSTRACT

Methods and systems for retirement planning that provides an insurance against a failure to obtain a desired retirement savings amount because of market forces. A retirement planning engine may run on a server and operates to determine a customer's retirement plans. The retirement planning engine may define a customer's retirement plan using one or more savings or investment vehicles, and details an amount to be saved of time in order to provide a desired income for the customer's retirement years. In some implementations, the retirement planning engine may offer a retirement "gap" insurance product to the customer to protect against a difference between the amount saved by the customer and the amount needed to achieve desired annual income for the retirement years. The insurance policy may cover this "gap" if the customer adheres to the plan defined by the retirement planning engine.

19 Claims, 4 Drawing Sheets

US 8,630,877 B1

SYSTEMS AND METHODS FOR RETIREMENT GAP INSURANCE

BACKGROUND

When tough economic times hit, individuals wonder whether they will be able to live comfortably on their retirement income. People who do not save for retirement during their employment years may face disappointment in the quality of life during their retirement years. As a general rule, people need 60 to 80 percent of their preretirement income to maintain their present standard of living. Government benefits, such as social security benefits, provide only a portion of that retirement income. Because income from social security and employer-sponsored plans may not meet retirement income needs, individuals may supplement their social security and pension income with personal savings and investments.

However, setting aside funds into personal savings and investments is not a guarantee for success. For example, market forces beyond a person's control may adversely affect retirement savings. If negative market forces should come into play during years close to retirement, a person may find that his/her expected standard of living in retirement may be much lower than expected. In addition, there is a likelihood that individuals in such a position will not be able to make up for losses before entering retirement.

SUMMARY

Methods and systems for retirement planning that provides an insurance against a failure to obtain a desired retirement savings amount because of market forces. A retirement planning engine may run on a server and operates to determine several factors associated with a customer's retirement plans. The retirement planning engine may define a customer's retirement plan using one or more savings or investment vehicles, and details an amount to be saved of time in order to provide a desired income for the customer for in the customer's retirement years.

In some implementations, the retirement planning engine may offer a retirement "gap" insurance product to the customer. For example, a difference (i.e., gap) may exist between the amount saved by the customer and the amount needed to achieve desired annual income for the retirement years. The retirement gap insurance policy may cover this "gap" in exchange for the customer adhering to the plan defined by the retirement planning engine and paying a policy premium.

The foregoing is a summary and thus contains, by necessity, simplifications, generalizations and omissions of detail. Those skilled in the art will appreciate that the summary is illustrative only and is not intended to be in any way limiting.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the invention is not limited to the specific methods and instrumentalities disclosed. In the drawings.

DETAILED DESCRIPTION

Figure 1:
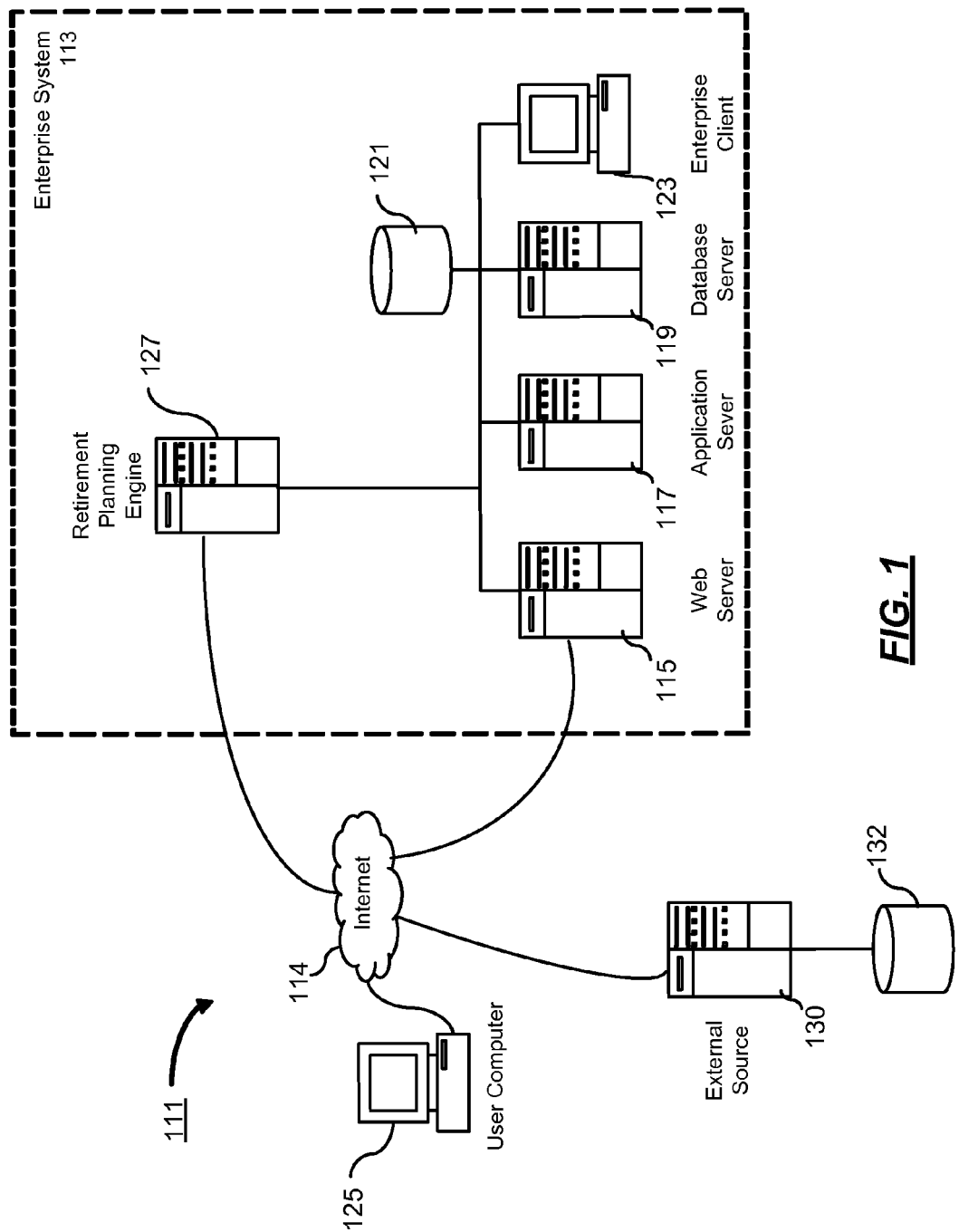
FIG. 1 is an example environment in which the systems and methods for providing retirement gap insurance may be implemented.
Figure 4:
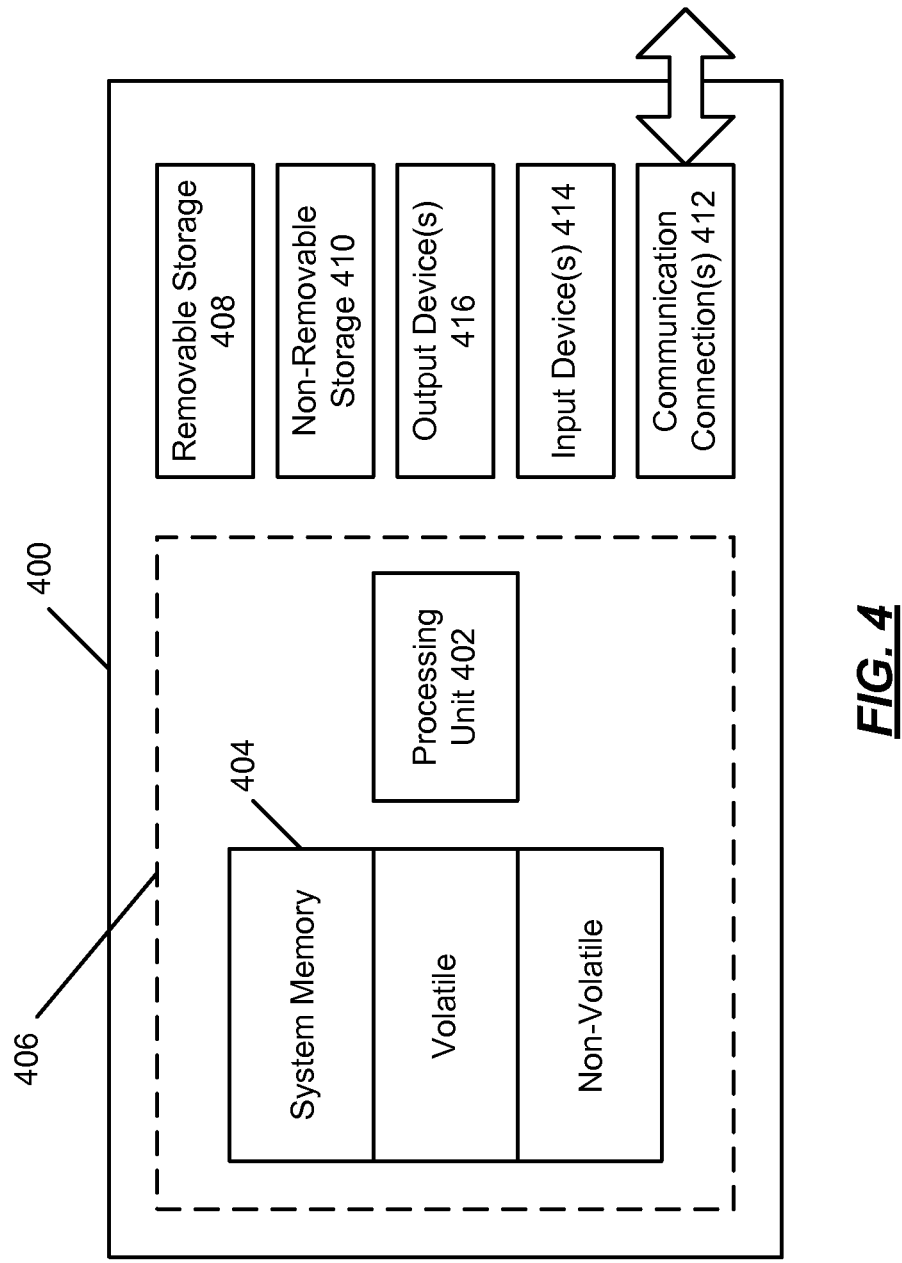
FIG. 4 illustrates an exemplary computing device in which aspects described herein may be implemented.

Illustrated in FIG. 1 is an example environment in which the systems and methods for providing retirement gap insurance may be implemented. The system 111 may be implemented as a client/server system through a network infrastructure 114, such as the Internet, a WAN, LAN, etc. In this regard, any computer system or environment having any number of processing, memory, or storage units, and any number of applications and processes occurring simultaneously, is considered suitable for use in connection with the system 111 and methods described herein below. An example computing device is illustrated in FIG. 4.

An enterprise system 113 is provided which may include a web server 115, an application server 117, and a database server 119 with an associated data store 121. Also included in the enterprise system may be a plurality of enterprise client computers 123, such as computers may be operated by customer service representatives. The data store 121 may include internal customer account information, such as checking accounts, savings accounts, brokerage accounts, retirement accounts and/or liability accounts (e.g., lines of credit, mortgages, auto loans, etc.) that may be held at a financial services institution associated with the system 111.

An external source 130 may be other financial services institutions that hold the one or more accounts associated with an individual. The account information may be stored in a data store 132. The data store 132 may include customer account information, such as checking accounts, savings accounts, brokerage accounts, retirement accounts and/or liability accounts that may affect a customer's retirement planning determinations.

A retirement planning engine 127 may run on a server and operates to determine several factors associated with a customer's retirement plans. For example, the retirement planning engine 127 may determine and/or receive information regarding: an age the customer wishes to retire, an annual desired income for the customer's retirement years (e.g., 80% of a current annual salary), a current market value of all of the customer's savings and investments (both internal and external accounts), an annualized rate of return (net of inflation) on investments (e.g., inflation may be 4% annually and a rate of return may be 6-10%), an estimate of a customer's pension plan value, and an estimate the value of the customer's social security benefits. As will be described below in greater detail, the retirement planning engine 127 may query the customer with regard to personal and financial information in order to determine an appropriate retirement plan.

The retirement planning engine 127 may define a customer's retirement plan using one or more savings or investment vehicles. One type of savings plan is the employer-sponsored retirement plan allowing employee deferrals (401(k) plans). In such a plan, an employee's contributions are deducted from their salary as a pretax contribution (reducing their current taxable income) and any investment earnings are tax deferred until withdrawn. These plans often include employer-matching contributions that make these types of plans an effective savings plan for retirement.

Individual retirement accounts (IRAs), like employer-sponsored retirement plans, feature tax deferral of earnings. An IRA is a personal savings plan that offers specific tax benefits. Traditional IRAs may enable a consumer to lower their taxable income through deductible contributions. Roth IRAs do not permit tax-deductible contributions, but do allow the consumer to make tax-free withdrawals under certain conditions.

Another way of saving for the future is through annuities. Annuities are generally funded with after-tax dollars, but their earnings are tax-deferred. There is generally no annual limit on contributions to an annuity. A typical annuity provides income payments beginning at some future time, usually at retirement. Other savings vehicles may life insurance products, non-deferred investment accounts, etc.

The retirement planning engine 127 may produce a retirement or investment plan for the customer that details an amount to be saved of time in order to provide a desired income for the customer for in the customer's retirement years. In some implementations, the retirement planning engine 127 may offer a retirement "gap" insurance product to the customer. As noted above, to achieve the desired annual income for the customer's retirement years, the above factors of inflation and rate of return are utilized. However, it is possible that inflation is higher than expected or the rate of return is lower than the rate utilized by the retirement planning engine 127 in its analysis. As such, a customer approaching retirement years may not have enough actual saving to achieve the desired annual income input to the retirement planning engine 127. This difference between the amount saved by the customer and the desired annual income for the retirement years is the "gap." In accordance with some implementations, the retirement gap insurance policy may cover this "gap" in exchange for the customer adhering to a plan defined by the retirement planning engine 127 and paying a policy premium.

For example, if the customer is 40 years old and would like to retire at age 65 with an annual income of $50,000 per year, the retirement planning engine 127 may determine the customer needs to accumulated $1.125 million in retirement savings. The retirement planning engine 127 may determine that the customer should save $1,700 per month in a combination of tax-deferred retirement and taxable savings accounts. An additional premium amount may be added for the retirement gap coverage (e.g., $250/month) based on the customer's age, economic forecasts, historical investment performance, etc., as underwriting factors. If the customer agrees to terms the conditions of the retirement gap insurance policy, the customer would deposit, e.g., $1,950 per month with the financial services institution as a periodic payment amount to cover the retirement savings and premium amounts. The premium amount may be adjusted during the coverage period for changes in inflation, rate of return, age of the customer, and other risk factors.

The financial services institution may invest the funds as determined or adjusted by the retirement planning engine 127 or accordance with other parameters. Thus, if the customer adheres to the investment schedule set by the retirement planning engine 127 by making the periodic payments until the retirement age, and the market forces should adversely affect the rate of return or rate of inflation such that the customer falls short of the goal of $1.125 million (i.e., the retirement savings), the retirement gap insurance policy would make up the difference between the shortfall and the $1.125 million amount determined by the retirement planning engine 127. As such, the customer may be provided with peace of mind because the retirement gap insurance policy would insure against adverse market conditions.

It some implementations, the retirement planning engine 127 may provide a drawdown schedule whereby the customer will receive periodic payments upon attaining the specified retirement age. The drawdown schedule may be created based on expected number of years a customer will live into retirement, the rate of inflation, the rate of return of the customer's investments, and the annual income the customer desires to receive during the retirement years. The drawdown schedule may be enforced by the retirement planning engine 127 such that the customer is unable to withdraw funds at a rate exceeding the schedule except under predetermined circumstances.

In some implementations, the retirement planning engine 127 may pool funds of all customers to reduce exposure to market fluctuations. For example, a severe downturn may occur which has an adverse effect on older customers in the pool. However, because younger customers are still paying into the pool, the risk to the financial services institution may be mitigated if the downturn is not for an extended period of time. In some implementations, the financial services institution may mitigate exposure by placing a cap on the gap to be insured. For example, coverage may be limited to a gap of 25% between the customer's actual savings and the determined retirement savings needed to provide the annual income requested by customer when performing the retirement planning using the retirement planning engine 127.

Referring again to FIG. 1, it should be noted that the enterprise system 113 may comprise a plurality of web servers 115, application servers 117 and database servers 119, or all may be combined in a single computer device that provides the various functionalities of those servers. A user access system may be implemented as the web servers 115, in an implementation. The user access system, through the use of any suitable interactive web technology, provides an interactive experience to the user computer 125 through which access to and maintenance of their financial accounts can be accomplished. The user computers 125 may be Personal Digital Assistants (PDAs), handheld computing devices, wireless handsets, audio/video devices, music players, personal computers. As explained in more detail herein, the web server 115 may provide web pages that include a retirement planning service.

The network infrastructure 114 may enable a host of network topologies such as client/server, peer-to-peer, or hybrid architectures. The "client" is a user of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 1, any entity can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address that may be entered into a web browser to access the server or client. Any technology that provides interactivity through the web browser is considered to be within the scope of the present discussion and may include, without limitation, Hyper-Text Mark-Up Language (HTML), Dynamic HTML (DHTML), JavaScript, and Ajax.Access to the web servers 115 is provided to a plurality of user computers 125 through the Internet. Communication can be provided over a communications medium, e.g., client(s) and server(s) may be coupled to one another via TCP/IP connection(s) for high-capacity communication.

Figure 2:
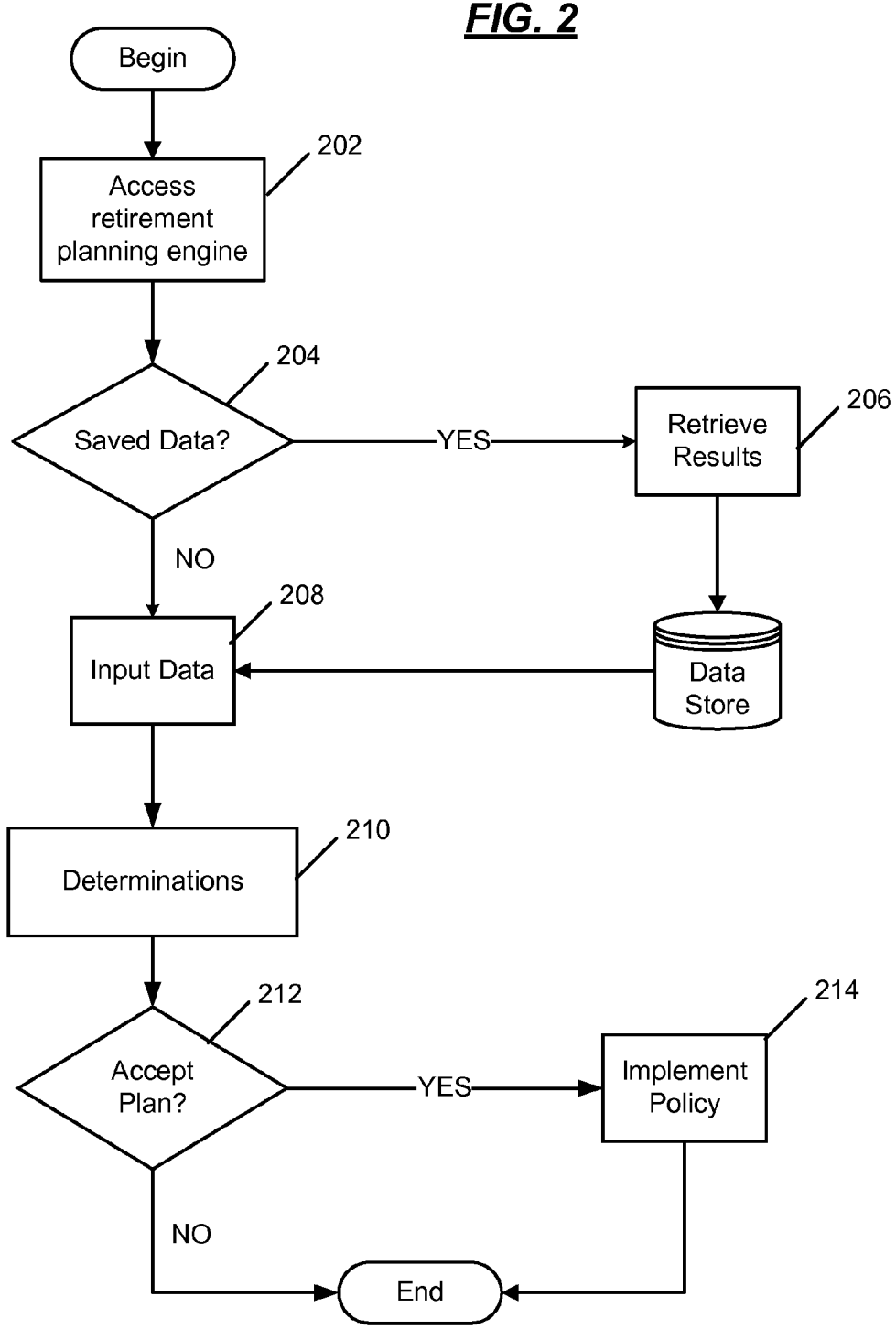
FIG. 2 illustrates an example operational flow of obtaining retirement gap insurance.

Referring now to FIG. 2, there is illustrated an example operational flow 200 of obtaining retirement gap insurance. At 202, a customer accesses the retirement planning engine. For example, using the user computer 125, the customer may access the web server 115 over the network infrastructure 114. The web server 115 may provide markup language or other instructions to the user computer 125 to render an interface on a browser.

At 204, is determined if the user has saved data associated with a plan at the retirement planning engine. If the user has saved data, at 206, the data is retrieved from the data store 121, and loaded by the retirement planning engine 127. Data entry fields may be pre-filled with the inputs saved from a previous session. The user may then have the option to keep or update the pre-filled inputs as the process continues at 208. If the user does not have saved data, then at 208, input data is requested from the customer with regard to conditions, parameters, family status, etc. that may have a bearing on in common in the customer's retirement years. Examples of such input data may include but are not be limited to:

1. First name
2. First name: (Spouse)
3. Date of birth: (User)
4. Date of birth: (Spouse)
5. Are you currently employed?: (User)
6. Are you currently employed?: (Spouse)
7. Age to retire: (User)
8. Age to retire: (Spouse)
9. Life expectancy: (User)
10. Life expectancy: (Spouse)
11. Current retirement savings (User)
12. Current retirement savings (Spouse)
13. Estimated yearly pension in retirement (User)
14. Estimated yearly pension in retirement (Spouse)
15. Is pension adjusted for inflation? (User)
16. Is pension adjusted for inflation? (Spouse)
17. Social Security Amount Expected: (User)
18. Social Security Amount Expected: (Spouse)
19. Total Annual Gross Income: (User)
20. Total Annual Gross Income: (Spouse)
21. Other income: (User)
22. Other income: (Spouse)
23. Rate of inflation: (User)
24. Rate of inflation: (Spouse)
25. Expected rate of return: (User)
26. Expected rate of return: (Spouse)
27. Expected replacement ratio: (User)
28. Expected replacement ratio: (Spouse)
29. Amount needed at Retirement in Future dollars
30. Monthly savings amount needed in today's dollars.
31. Estimated amount received yearly from user's investments
32. Estimated amount received monthly from user's investments.

Other data may not reside in the data store and may be requested for input by the user. Such data may include but is not limited to information at external sources 130 that is stored in the data store 132. This information may be retrieved by the retirement planning engine 127 over the network infrastructure 114. For example, a customer may provide a username and password to the retirement planning engine 127 in order for the retirement planning engine to access the external source 130. Information from the external source 130 may be ingested by the retirement planning engine 127 and factored with the information noted above.

At 210, determinations are made by the retirement planning engine. The customer may select an option to have a retirement plan determined. The process may validate the input data that has been provided at 208 or by external sources 130. If any requested data is missing or invalid, the process may notify the customer and may request that the customer provide or correct the data. The process may then determine a recommendation according to rules-based transactions and formulas, and may present a retirement plan to the customer. As part of the retirement plan, in some implementations, the retirement planning engine 127 may offer retirement gap insurance policy to the customer to counter any shortfalls that may occur in the customer's retirement plan.

At 212, it is determined if the customer accepts the plan with the retirement gap insurance policy. If the customer does not accept, the process ends. The customer does accept the retirement plan having the retirement gap insurance policy, then at 214, the plan is implemented. For example, the retirement planning engine 127 may provide the periodic policy payment amount, the total amount needed at retirement in future currency values, the monthly savings amount needed in terms of present value, etc. In further implementations, the estimated amount received yearly and/or monthly from the customer's investments may also be provided.

In some implementations, the retirement planning engine 127 provides directives as to the accounts where the customer's periodic policy payment amount will be used for retirement savings. The retirement planning engine 127 may provide an order in which the policy payment funds will be invested (i.e., 401(k), followed by IRA, followed by Annuities or Mutual Funds, followed by taxable savings). Where possible, the retirement planning engine 127 may require the investment/savings accounts be held at the financial services institution. The accounts and/or order of investment may be altered by the financial services institution to increase a rate of return.

The retirement planning engine 127 may provide additional helpful information to the customer to further understand the results, as well as provide suggestions for next steps. For example, the retirement planning engine 127 may present contact information for questions, links to other available online planning calculators, links to account application pages on the website, or inputs and assumptions used in the calculations. The retirement planning engine 127 may further provide options to edit the inputs in order to determine a new plan. The customer may be provided an option to return to 208 to update/edit/modify/delete inputs. Otherwise, the process then ends.

Figure 3:
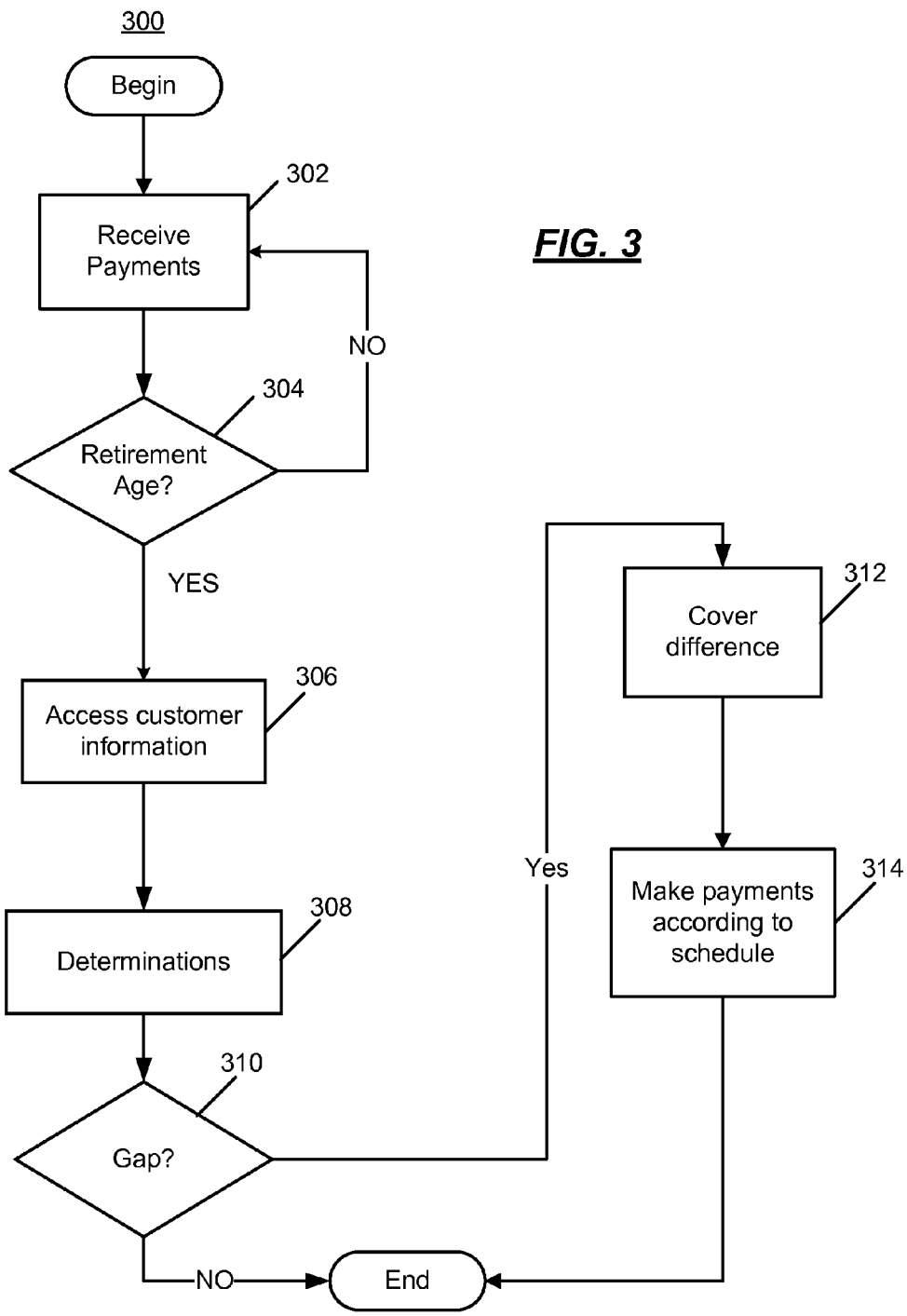
FIG. 3 illustrates an example operational flow of funding and receiving retirement gap insurance coverage at retirement.

Referring now to FIG. 3, there is illustrated an example operational flow 300 of funding and receiving retirement gap insurance coverage at retirement. At 302, the periodic policy payment amount is received by the financial services company. The payment may be invested, as noted above in accordance with determinations made by the retirement planning engine 127. Policy premiums are collected to be applied to the gap insurance. At 304, it is determined if the customer has reached the retirement age profiled by the retirement planning engine 127. If not, the process returns to await an additional payment. If so, then at 306, the customer information is accessed. This may be retrieved from the data store 121 and include account information, beneficiary information, etc. A check may be made to determine that the customer has complied with the retirement plan set by the retirement planning engine 127.

At 308, a determination is made as to the accumulated value of the customer's portfolio. This determination may include any accounts that will provide funds that may be applied to the customer's annual income during the retirement years. At 310, it is determined if a "gap" exists. The gap may be determined as the difference between the amount saved by the customer in the account accessed at 306, and the desired annual income for the retirement years, as set in the retirement planning engine 127.

If at 310, no gap exists, the process ends. In some implementations, some or all of the premium payments made during the policy period may be returned to the customer as cash, an annuity or other product, as a savings vehicle.

If at 310, there is a gap, then at 312, the retirement gap insurance policy covers the gap if the terms and conditions of the policy are met. At 314, payments to the customer commence according to a schedule set by the retirement planning engine. The schedule may be set in accordance with the data received at 208 such that desired annual income during the customer's retirement years can be achieved.

Thus, as described above, a customer may develop a retirement plan and apply for gap coverage to insure against shortfalls in retirement savings due to market forces that are beyond the customer's control. This may provide comfort to the customer, especially as the customer nears retirement, that he/she will be able to maintain an expected lifestyle in retirement.

FIG. 4 shows an exemplary computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 4, an exemplary system for implementing aspects described herein includes a computing device, such as computing device 400. In its most basic configuration, computing device 400 typically includes at least one processing unit 402 and system memory 404. Depending on the exact configuration and type of computing device, system memory 404 may be volatile (such as random access memory (RAM)), non-volatile (such as read-only memory (ROM), flash memory, etc.), or some combination of the two. This most basic configuration is illustrated in FIG. 4 by dashed line 406.

Computing device 400 may have additional features and/or functionality. For example, computing device 400 may include additional storage (removable and/or non-removable) including, but not limited to, magnetic or optical disks or tape. Such additional storage is illustrated in FIG. 4 by removable storage 408 and non-removable storage 410.

Computing device 400 typically includes a variety of computer-readable media. Computer-readable media can be any available media that can be accessed by computing device 400 and includes both volatile and non-volatile media, removable and non-removable media. By way of example, and not limitation, computer-readable media may comprise computer storage media and communication media.

Computer storage media include volatile and non-volatile, removable and non-removable media implemented in any method or technology for storage of information such as computer-readable instructions, data structures, program modules or other data. System memory 404, removable storage 408, and non-removable storage 410 are all examples of computer storage media. Computer storage media includes, but are not limited to, RAM, ROM, Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 400. Any such computer storage media may be part of computing device 400.

Computing device 400 may also contain communication connection(s) 412 that allow the computing device 400 to communicate with other devices. Communication connection(s) 412 is an example of communication media. Communication media typically embody computer-readable instructions, data structures, program modules, or other data in a modulated data signal such as a carrier wave or other transport mechanism, and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media. The term computer-readable media as used herein includes both storage media and communication media.

Computing device 400 may also have input device(s) 414 such as keyboard, mouse, pen, voice input device, touch input device, etc. Output device(s) 416 such as a display, speakers, printer, etc. may also be included. All these devices are well known in the art and need not be discussed at length here.

Computing device 400 may be one of a plurality of computing devices 400 inter-connected by a network. As may be appreciated, the network may be any appropriate network, each computing device 400 may be connected thereto by way of communication connection(s) 412 in any appropriate manner, and each computing device 400 may communicate with one or more of the other computing devices 400 in the network in any appropriate manner. For example, the network may be a wired or wireless network within an organization or home or the like, and may include a direct or indirect coupling to an external network such as the Internet or the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high level procedural or object-oriented programming language to communicate with a computer system. However, the program(s) can be implemented in assembly or machine language, if desired. In any case, the language may be a compiled or interpreted language and it may be combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system for providing retirement gap insurance, the system comprising:
    a processor;
    a non-transitory computer-readable medium coupled to the processor and storing a plurality of instructions, which, when executed, cause the processor to provide the retirement gap insurance, the plurality of instructions comprising:
        instructions that cause the processor to receive input data regarding assets and liabilities from a customer who has not attained retirement age;
        instructions that cause the processor to determine a retirement plan using the input data for the customer in order to determine a retirement plan amount that will provide income for a predetermined number of years after the customer reaches the retirement age, the retirement plan including a first periodic payment amount to be deposited into retirement savings and a second periodic payment of a premium amount associated with the retirement gap insurance;
        instructions that cause the processor to define the retirement savings as an investment plan comprising one or more investment products for the customer;
        instructions that cause the processor to deposit the first periodic payment amount into the one or more investment products defined by the investment plan, wherein paying the second periodic payment of the premium amount associated with the retirement gap insurance and adhering to the investment plan including depositing the first periodic payment amount into the one or more investment products by the customer are preconditions for covering a shortfall in the retirement savings compared to the retirement plan amount through the retirement gap insurance when the customer enters a retirement period;
        instructions that cause the processor to determine, at the retirement age, a value of the retirement savings;
        instructions that cause the processor to compare the value of the retirement savings to the retirement plan amount to determine if a difference in the value of the retirement savings and the retirement plan amount exists;
        instructions that cause the processor to cover the difference when the customer enters the retirement period if the value of the retirement savings is lower than the retirement plan amount and if the customer adhered to the investment plan including depositing the first periodic payment amount into the investment products defined by the investment plan and paid the second periodic payment of the premium amount associated with the retirement gap insurance, and
        instructions that cause the processor to return a portion of the second periodic payment of the premium amount to the customer if the value of the retirement savings is greater than the retirement plan amount.

2. The system of claim 1, wherein the investment plan defines an order and amount of the first periodic payment amount that is to be deposited to each of the one or more investment products.

3. The system of claim 1, wherein the non-transitory computer-readable medium further comprises instructions that cause the processor to pool the premium amount with premium amounts of other customers to offset the difference.

4. The system of claim 1, wherein the non-transitory computer-readable medium further comprises instructions that cause the processor to ascertain the input data from external account sources.

5. A system for retirement planning, comprising:
    a processor;
    a non-transitory computer-readable medium coupled to the processor and storing a plurality of instructions, which, when executed, cause the processor to provide retirement planning, the plurality of instructions comprising:
        instructions that cause the processor to receive customer input data regarding assets, liabilities, a life expectancy and a retirement income;
        instructions that cause the processor to provide an investment plan to achieve a desired amount of retirement assets to fund the retirement income, the investment plan including insurance coverage to meet the retirement income if market conditions result in the retirement assets being below the desired amount;

instructions that cause the processor to receive first periodic payments to be applied to investment accounts identified by the investment plan and second periodic payments of a premium amount associated with the insurance coverage, wherein paying the second periodic payments of the premium amount associated with the insurance coverage and adhering to the investment plan including depositing the first periodic payments towards the investment accounts by the customer are preconditions for providing the insurance coverage to cover the retirement income if market conditions result in the retirement assets being below the desired amount;

instructions that cause the processor to fund the investment accounts in a predetermined order defined by the investment plan;

instructions that cause the processor to provide coverage for a difference between the desired amount of retirement assets and an actual amount of retirement assets when the customer enters a retirement period if the customer adhered to the investment plan including depositing the first periodic payments towards the investment accounts identified by the investment plan and paid the second periodic payments of the premium amount associated with the insurance coverage, and instructions that cause the processor to return a portion of the second periodic payment of the premium amount to the customer if the value of the retirement savings is greater than the retirement plan amount.

6. The system of claim 5, wherein the non-transitory computer-readable medium further comprises instructions that cause the processor to determine a schedule of income payments to the customer during the retirement period.

7. The system of claim 6, wherein a portion of the income payments to the customer are funded through the insurance coverage.

8. The system of claim 5, wherein the non-transitory computer-readable medium further comprises instructions that cause the processor to periodically change the investment accounts or an order of funding the investment accounts.

9. The system of claim 5, wherein the non-transitory computer-readable medium further comprises instructions that cause the processor to pool the second periodic payments of the premium amount with a plurality of customers to offset the difference for a particular customer.

10. The system of claim 5, wherein the non-transitory computer-readable medium further comprises instructions that cause the processor to ascertain the input data from external account sources.

11. The system of claim 10, wherein the non-transitory computer-readable medium further comprises instructions that cause the processor to periodically adjust the investment plan using a value of the external account sources.

12. A system for insuring retirement accounts against adverse market conditions, the system comprising:
a processor;
a non-transitory computer-readable medium coupled to the processor and storing a plurality of instructions, which, when executed, cause the processor to insure the retirement accounts against adverse market conditions, the plurality of instructions comprising:
instructions that cause the processor to evaluate customer input data to determine an investment plan, the investment plan accounting for a target retirement asset goal and including insurance coverage to cover a shortfall of actual assets versus the target retirement asset goal;
instructions that cause the processor to receive first periodic payments to fund investment accounts identified by the investment plan and second periodic payments of a premium amount associated with the insurance coverage, wherein paying the second periodic payments of the premium amount associated with the insurance coverage and adhering to the investment plan including submitting the first periodic payments by the customer to fund the investment accounts identified by the investment plan are preconditions for providing the insurance coverage;
instructions that cause the processor to make periodic income payments to a customer using a schedule of payments during a retirement period and covering, in the periodic income payments, the shortfall of the actual assets versus the target retirement asset goal, if the shortfall exists and the customer adhered to the investment plan including depositing the first periodic payments to fund the investment accounts identified by the investment plan and paid the second periodic payments of the premium amount associated with the insurance coverage, and
instructions that cause the processor to refund a portion of the second periodic payments of the premium amount if there is no shortfall.

13. The system of claim 12, wherein a portion of the income payments are funded through the insurance coverage.

14. The system of claim 12, wherein the non-transitory computer-readable medium further comprises instructions that cause the processor to periodically change the investment accounts or an order of funding the investment accounts.

15. The system of claim 12, wherein the non-transitory computer-readable medium further comprises instructions that cause the processor to pool premium amounts of a plurality of customers to offset the difference for a particular customer.

16. The system of claim 12, wherein the non-transitory computer-readable medium further comprises instructions that cause the processor to ascertain the input data from external account sources.

17. The system of claim 16, wherein the non-transitory computer-readable medium further comprises instructions that cause the processor to adjust the investment plan using a value of the external account sources.

18. The system of claim 1, wherein the non-transitory computer-readable medium further comprises instructions that cause the processor to adjust the premium amount during a coverage period of the retirement gap insurance for changes in risk factors.

19. The system of claim 1, wherein the non-transitory computer-readable medium further comprises:
instructions that cause the processor to provide a drawdown schedule for receiving periodic retirement income payments when the customer enters the retirement period; and
instructions that cause the processor to enforce the drawdown schedule during the retirement period, prohibiting the customer from withdrawing funds at a rate exceeding the drawdown schedule.

* * * * *